United States Patent [19]
Bouchard

[11] Patent Number: 5,397,472
[45] Date of Patent: Mar. 14, 1995

[54] DOUBLE FLOW SEGMENTED SETTLING TANK

[75] Inventor: Christian Bouchard, Le Pre Saint Gervais, France

[73] Assignee: GEC Alsthom Bergeron SA, Fontenay Sous Bois, France

[21] Appl. No.: 170,732

[22] Filed: Dec. 21, 1993

[30] Foreign Application Priority Data

Dec. 21, 1992 [FR] France .................................. 92 15330

[51] Int. Cl.⁶ .............................................. B01D 21/02
[52] U.S. Cl. ..................................... 210/519; 210/521; 210/532.1
[58] Field of Search ...................... 210/519, 521, 532.1, 210/534, 540

[56] References Cited

U.S. PATENT DOCUMENTS

| | | | |
|---|---|---|---|
| 853,704 | 5/1907 | Lewicki | 210/534 |
| 863,168 | 8/1907 | Griswold, Jr. | 210/521 |
| 2,799,645 | 7/1957 | Musgrove | 210/521 |
| 3,552,554 | 1/1971 | Olgard | 210/521 |
| 4,351,733 | 9/1982 | Salzer et al. | 210/521 |

Primary Examiner—Christopher Upton
Attorney, Agent, or Firm—Sughrue, Mion, Zinn, Macpeak & Seas

[57] ABSTRACT

The plates of the settling tank define counter-flow streams connected to the inlet of the settling tank and supplying parallel flow streams connected to the outlet of the settling tank. Deposits from these two types of streams are received in two corresponding collecting tanks. The invention is particularly applicable to the filtration of water.

9 Claims, 4 Drawing Sheets

DOUBLE FLOW SEGMENTED SETTLING TANK

FIELD OF THE INVENTION

The present invention relates to a segmented settling tank. Such settling tanks are used to filter a base fluid that is charged with particles. The fluid is typically water and the particles are typically solid and more dense than water. However, they are put into suspension or they are held in suspension by turbulence affecting the water. Settling tanks are arranged to allow the action of gravity to deposit such particles on collecting walls forming the bottom walls of streams where the water passes at low speed and always under conditions of laminar flow.

BACKGROUND OF THE INVENTION

For a settling tank of given volume, the lower the sedimentation speed of the particles to be extracted by the tank, the smaller the throughput of water which it is capable of filtering, sedimentation speed being lower for finer particles or for a smaller difference in density relative to the base liquid constituted by the water carrying the particles. In order to increase the throughput of particle-charged water which can be filtered per unit volume of settling tank, it is known that the collecting surfaces can be constituted by a large number of inclined parallel plates forming between them a large number of water circulation streams, either in counter-flow i.e. the water moves upwards while the gravitational movement of the particles relative to the water is downwards, or in parallel flow, i.e. all movement is downwards. Other things being equal a parallel flow stream, i.e. one in which flow takes place in parallel, allows finer particles to be deposited more rapidly than does a counter-flow stream.

PRIOR ART

A known segmented settling tank is shown in vertical section in FIG. 1. It comprises inclined plates 101, 102, 103, 104 . . . 109, 110 defining parallel flow streams such as those between the plates 102 and 103 and between plates 110 and 111, and also counter-flow streams such as those between plates 101 and 102 and between plates 109 and 110. Each parallel flow stream is connected in series with a counter-flow stream between an inlet 120 and an outlet 122 of the settling tank so as to allow particles contained in a fluid flowing continuously into the inlet to be deposited under gravity from a said stream in the form of a sediment on one of said plates. The settling tank also comprises a collecting volume 124 to receive said sediment continuously after it has slid under gravity to an edge of the plate and has escaped from it.

In each segment of the settling tank constituted by a parallel flow stream and a counter-flow stream, the sediment is collected only from the parallel flow stream. Because of the high positions of the inlet and of the outlet of the settling tank and because of the low position of an edge of a plate around which the direction of water flow reverses, the water flows along the parallel flow stream before it flows along the counter-flow stream. The flow reversal edge is constituted by the bottom edge of the intermediate plate such as 102 or 110 of the segment.

Reversal of the flow direction is facilitated by a curved guide such as 130 or 138.

The deposit collected in the collecting volume 124 is discharged through an orifice 125.

OBJECTS AND SUMMARY OF THE INVENTION

Particular objects of the present invention are to allow the throughput of water filtered by a segmented settling tank of given capacity to be increased in a simple manner and/or to reduce the size of that settling tank for a given throughput to be filtered and/or to allow the extraction of particles of lower sedimentation speed than previously, the being achieved whether the particles to be extracted are of higher density than water or whether on the contrary they are of lower density than water, such as oil droplets. It will be understood that the invention also aims to achieve these objects when the base fluid carrying the particles to be extracted is not water.

To satisfy these objects, the present invention provides a double-flow segmented settling tank comprising a succession of inclined plates defining at least one parallel flow stream and at least one counter-flow stream, the said parallel flow and counter-flow streams being connected in series between an inlet and an outlet of the settling tank so as to allow the particles contained in a fluid flowing continuously into the said inlet to deposit a sediment under gravity from one of said streams onto one of said plates, the settling tank also comprising a collecting volume to receive said sediment continuously after it has slid under gravity to an edge of said plate and has escaped from it, wherein said inlet is connected to said counter-flow stream and said parallel flow stream is connected to said outlet, so that said sediment is deposited on a said plate and is received in a said collecting volume from each of said two streams.

BRIEF DESCRIPTION OF THE DRAWINGS

The manner in which the present invention is carried out is described below with reference to the accompanying diagrammatic figures, it being understood that the elements and arrangements mentioned and shown are given only by way of non-limiting example. Where the same element is shown in several drawings, it is designated in each of them by the same reference symbol.

MORE DETAILED DESCRIPTION

Figure 1:
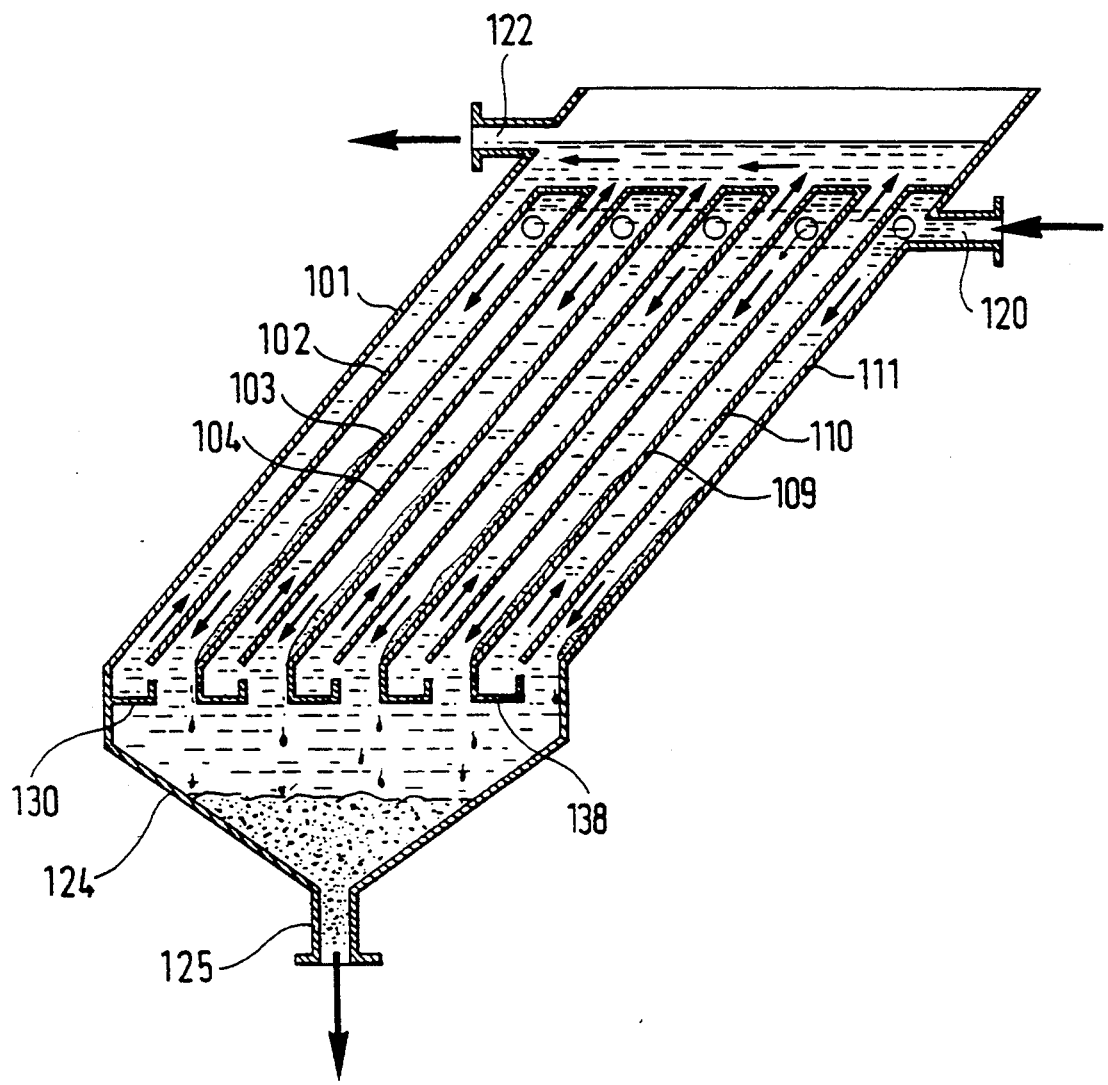
FIG. 1 has already been described and shows a vertical longitudinal section through a known segmented settling tank.
Figure 2:
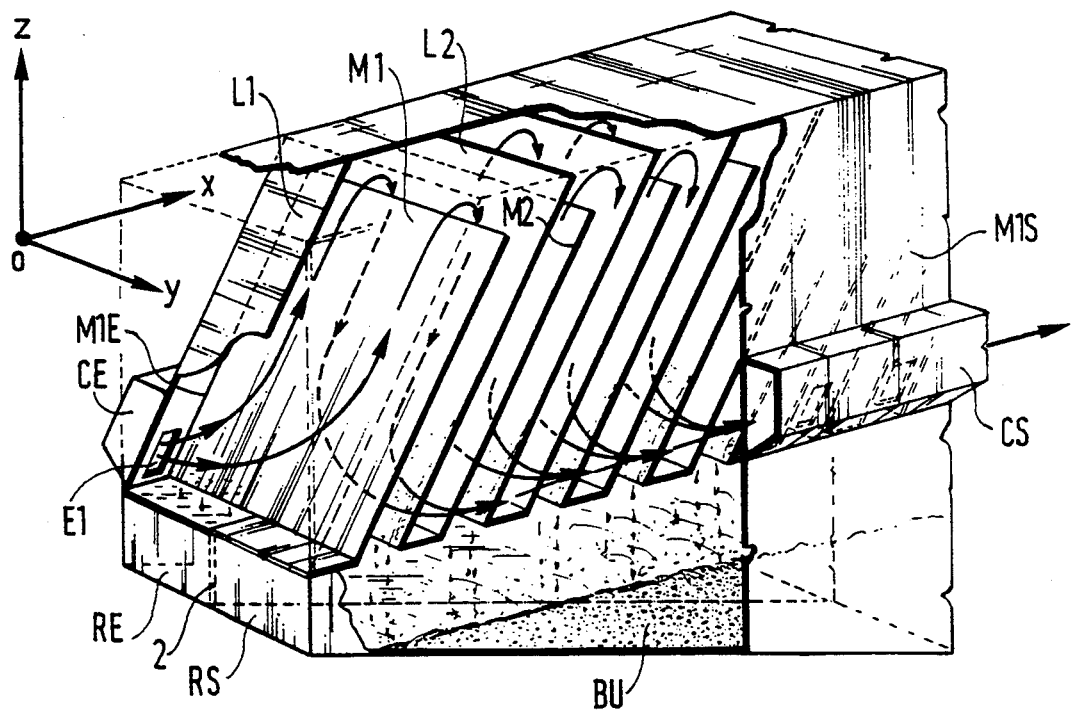
FIG. 2 shows a perspective view of the plates and the collecting tanks of a settling tank in accordance with the present invention.
Figure 3:
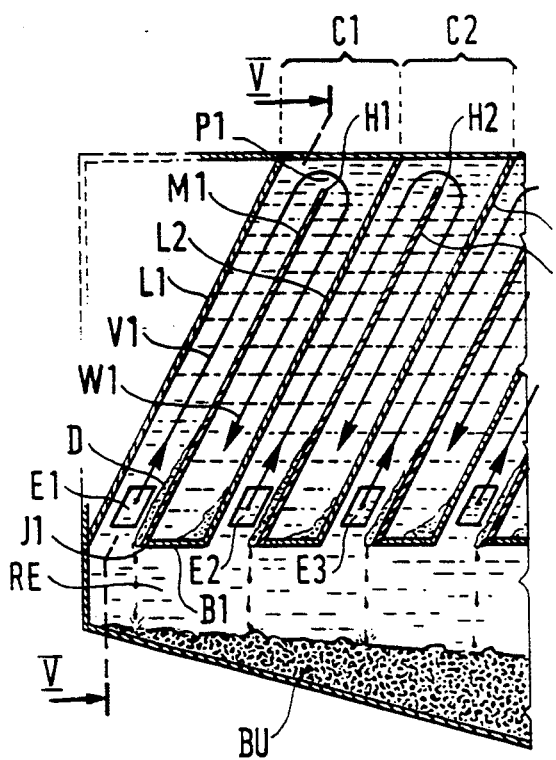
FIGS. 3, 4 and 5 show section views of the plates and the collecting tanks of FIG. 2 along lines III—III and IV—IV of FIG. 5; and V—V of FIG. 3, respectively.
Figure 4:
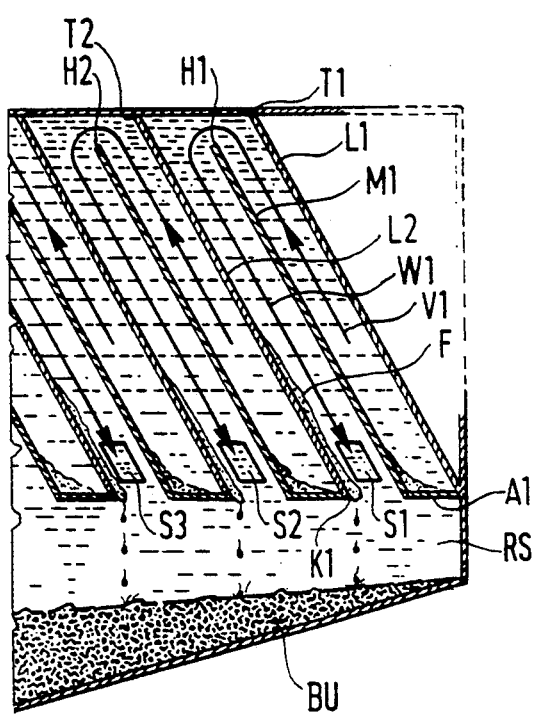
Figure 5:
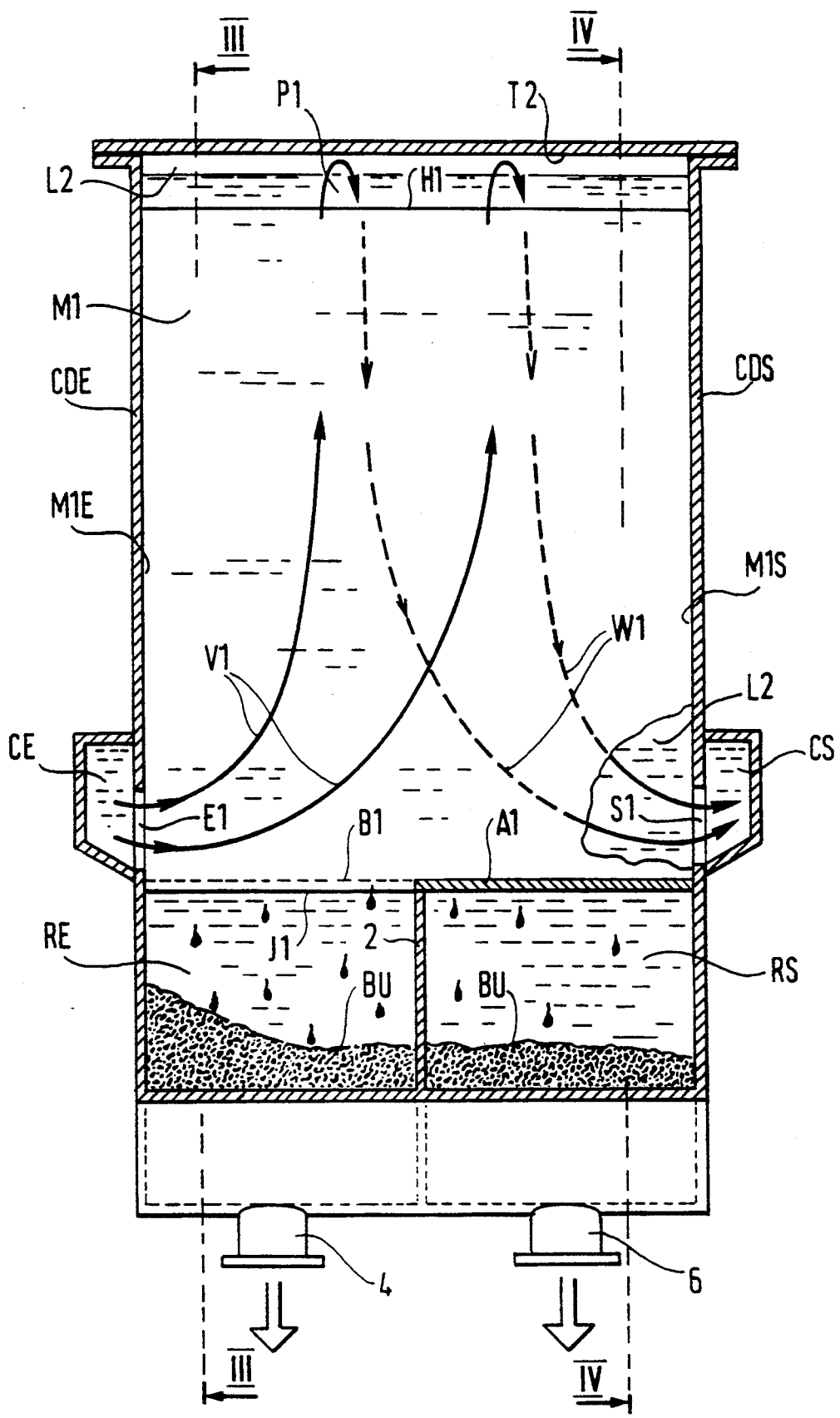
Figure 6:
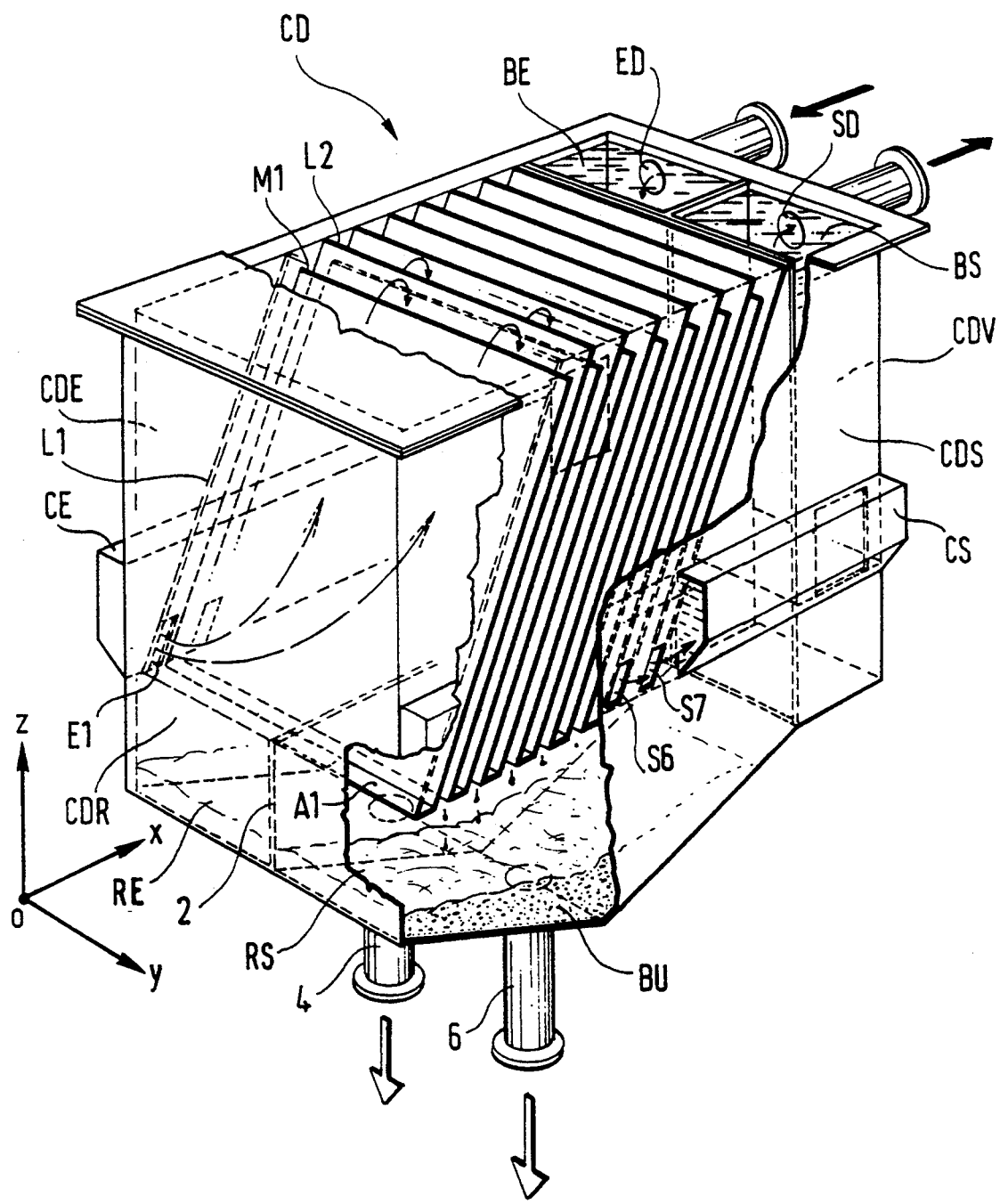
FIG. 6 shows a perspective view of the complete settling tank of FIG. 2.

The essential elements of a double-flow segmented settling tank are initially described in general terms with reference to FIG. 2 and the following figures by way of example, it being assumed that the particles to be extracted are either more dense or less dense than the base fluid. The elements which are described first are the above-mentioned elements common to known settling tanks and to the present invention. These common elements are as follows:

A settling tank inlet ED for receiving an input fluid constituted by the base fluid carrying particles in suspension which are of a density different from that of the base fluid. The difference in density has one sign or the opposite sign according to whether these particles are more dense or less dense than the base fluid. The input fluid has an input concentration of these particles.

A settling tank body CD extending in a horizontal longitudinal direction OX between a rear side CDR and a front side CDV, in a horizontal transverse direction OY between two mutually-opposite sides CDE, CDS, and in the vertical direction OZ as defined by gravity. Two mutually-opposite vertical directions OZ, ZO and heights or "altitudes" Z are defined vertically and increase in a "positive" direction that is defined below. The body is connected to the inlet ED of the settling tank so that the input fluid remains within the body for a time during which the particles are driven by gravity in sedimentation displacement relative to the base fluid. The displacement takes place vertically, in a sedimentation direction ZO that depends on the sign of the difference in density. More precisely, the sedimentation direction is downwards or upwards according to whether the particles are more dense or less dense than the base fluid. It corresponds to a decrease in said "altitudes" Z. The particles remain within the body for a sufficient length of time for the sedimentation displacement to cause a deposit BU to be extracted from the input fluid, which deposit BU is constituted by at least some of the particles.

A settling tank outlet SD connected to the settling tank body CD to provide an output fluid derived from the input fluid and constituted at least principally by the base fluid. The output fluid has an output concentration of particles which is at least reduced relative to the inlet concentration, due to the deposit being extracted. The output concentration would be zero if all the particles were extracted.

Finally, a collecting volume RE fed from the settling tank body to receive the deposit and to allow it to be discharged from the settling tank.

The settling tank body CD comprises plates L1, M1, L2, M2, L3 . . . in succession from the rear to the front and each plate, such as plate M1, has a width in said transverse direction between two lateral edges M1E, M1S. Each plate also has a length extending in a plate direction between a smaller "altitude" edge J1 and a greater "altitude" edge H1 constituting two extreme edges of that plate. The plate defines two mutually-opposite directions H1, J1 and J1, H1. Each plate being inclined so that the plate direction is oblique between the longitudinal and the vertical directions, all the plates being inclined in a same direction so that in the longitudinal direction, their greater "altitude" edges are all on the same side of their respective smaller "altitude" edges.

Each plate L1, except for the last plate, cooperates with a consecutive plate M1 to form a stream V1 in which the base fluid flows along the plate. The two plates forming the stream constitute a collecting plate M1 and a non-collecting plate L1 such that the point where the collecting plate meets any given vertical line is situated at an "altitude" that is smaller than that at which the non-collecting plate meets the same vertical line.

The settling tank body CD has at least one segment C1 which itself comprises three plates arranged consecutively and constituting a rear plate L1, an intermediate plate M1, and a front plate L2 of the segment.

The rear plate L1 and the intermediate plate M1 form between them a primary stream V1 of the segment. The base fluid passes along the stream in a primary flow direction J1, H1 along the plate. The flow takes place from an inlet E1 of the segment, the inlet being connected to the inlet ED of the settling tank, and it goes to an intermediate passage P1 of the segment. The flow is arranged such that the sedimentation displacement deposits a primary sediment D on the collecting plate M1 of the stream. The flow speeds in particular are chosen to be sufficiently small for that to happen. A collecting volume RE is arranged to receive the sediment when it escapes from the collecting plate. The sediment thus constitutes said deposit in the collecting volume.

The intermediate and front plates M1 and L2 form between them a secondary stream W1 along which the base fluid passes in a secondary flow in the direction H1, K1 opposite to the primary flow direction. The fluid passes into there from the intermediate passage P1 and passes on to an outlet S1 of the segment, the outlet being connected to the outlet SD of the settling tank.

The intermediate passage is formed around a flow reversal edge H1 constituted by an extreme edge of the intermediate plate M1. The collecting plates of the primary and secondary streams V1 and W1 will hereinafter be designated more simply as the "primary collecting" plate M1 and as the "secondary collecting" plate L2.

The settling tank of the present invention differs from said known settling tank in that the flow reversal edge H1 is constituted by the greater "altitude" edge of the intermediate plate M1, the inlet E1 and the outlet S1 of the segment being situated adjacent the smaller "altitude" edge J1 of the intermediate plate. As a result, the primary stream V1 is a counter-flow stream and the secondary stream W1 is a parallel flow stream. This allows a secondary sediment F composed of relatively fine particles to be deposited on the secondary collecting plate L2. A collecting volume RS is arranged to receive the secondary sediment when it escapes from said secondary collecting plate, the sediment also contributing to said deposit in said collecting volume.

Preferably, the inlet E1 and the outlet S1 of said segment C1 are lateral, i.e. they are situated respectively on the inlet side CDE and the outlet side CDS of the settling tank body CD, these sides constituting said two mutually-opposite sides in the transverse direction OY. The lateral inlet and outlet are also situated at "altitudes" greater than that of the primary and secondary escape edges from which the sediments escape from the collecting plates. These edges are the smaller "altitude" edges J1 and K1 of the primary and secondary collecting plates M1 and L2 respectively.

The advantage of having the inlet and outlet openings of the segment positioned in this way relates to the fact that the currents induced in the base fluid in the vicinity of the openings might be of sufficient strength to break up imperfectly agglomerated fragments of sediment which become detached from the escape edges, thus putting them back into suspension. The advantage here is that the currents do not encounter such fragments and therefore cannot break them up.

The segment C1 also comprises a primary collecting volume RE and a secondary collecting volume RS at "altitudes" lower than those of the primary and secondary escape edges J1 and K1 to receive the primary and secondary sediments D and F. In the settling tank given as an example of the present invention, the plates L1, M1, L2, M2, L3 ... are inclined in a direction such that their greater "altitude" edges H1 are in front of their respective smaller "altitude" edges J1. The intermediate and front plates M1 and L2 therefore constitute said primary and secondary collecting plates V1 and W1 respectively.

Preferably, the settling tank body CD comprises a longitudinal succession of such segments C1, C2 ..., and the front plate L2 of each segment C1, except for the last segment, also constitutes the rear plate of the following segment C2. The greater j"altitude" edges T1, T2 ... of the front and rear plates L1, L2, L3 are therefore formed at "altitudes" above those of the flow reversal edges H1, H2 so as to isolate the segments from one another by these front and rear plates whilst also defining said intermediate passages P1 within the segments at "altitudes" above those of these inversion edges.

The primary collecting volumes R2 (or the secondary volumes RS) of all the segments are connected together longitudinally along the same side of the body of the settling tank. They are constituted by successive longitudinal zones of a primary collecting tank RE (or a secondary tank RS, respectively). These primary and secondary collecting tanks are separated from one another by a vertical longitudinal partition 2. Each segment C1 also comprises primary and secondary closure walls A1 and B1 sealing the primary and secondary streams V1 and W1 from the secondary and primary collecting tanks RS and RE respectively. The partition and the closure walls prevent unwanted connection between the primary and secondary streams via the collecting tanks.

The primary and secondary collecting tanks RE and RS are situated on the inlet and outlet sides CDE and CDS respectively of the settling tank body CD. One advantage of the arrangement relates to the fact that the largest particles are deposited from the primary stream and in particular in the vicinity of the inlet to the segment. The arrangement therefore shortens the path which they have to travel to reach the collecting tank. Moreover, the width of the primary stream, i.e. the width of the gap between the rear and intermediate plates L1 and M1, is chosen to be sufficiently Great as to avoid the risk of clogging by these particles.

Preferably, the settling tank also comprises:
an inlet manifold CE (and an outlet manifold CS) extending longitudinally and interconnecting the inlets E1, E2 ... (and the outlets S1, S2 ... ) of all the segments C1, C2 ... (respectively),
an inlet tank BE (and outlet tank BS) connected to the inlet ED (and outlet SD) of the settling tank and to the inlet manifold (and outlet manifold) respectively, and
deposit discharge means 4, 6 for discharging deposit BU from the collecting tanks RE, RS. These discharge means are for example constituted by openings situated at the lower extremities of these tanks.

Typically, said base fluid is a base liquid, for example water, and said particles are more dense than the liquid. In which case, and as shown, said filtering direction is downwards, said "altitudes" increase upwards, said flow reversal edge H1 of a segment C1 is an upper edge of its intermediate plate M1, and the inlet E1 and outlet S1 of the segment are situated at the bottom of its primary and secondary streams V1 and W1 respectively.

The collecting tanks RE, RS are situated beneath the plates L1, M1, L2, M2, L3 and lower than the inlets and outlets of the segments C1, C2 ...

Conversely, if said particles are less dense than the fluid, then said "altitudes" increase downwards, and the entire structure is upside-down relative to the configuration shown and described.

I claim:

1. A double-flow segmented settling tank comprising a succession of inclined plates defining at least one parallel flow stream, flowing in a first flow direction, and at least one counter-flow stream flowing in a second flow direction opposite to said first flow direction, said parallel flow and counter-flow streams being connected in series between an inlet and an outlet of the settling tank so as to form means to allow particles contained in an input fluid flowing continuously into the inlet to deposit a sediment under gravity onto one of said plates, the particles settling parallel to fluid flow in said parallel flow stream and counter to fluid flow in said counter flow stream, the settling tank also comprising a collecting volume to receive said sediment continuously after it has slid under gravity to an edge of said one plate and has escaped from it, wherein said inlet is connected to said counter-flow stream, and said parallel flow stream is connected to said outlet, so that said sediment is deposited on said one plate and is received in said collecting volume from each of said two streams.

2. A settling tank according to claim 1 wherein:
said settling tank comprises supplying means for supplying to said settling tank inlet the input fluid from a source of fluid which is constituted by a base fluid carrying in suspension the particles, which are of a density different from that of the base fluid, the difference in density having a particular sign, said input fluid having an input concentration of said particles;
said settling tank further comprises a settling tank body extending in a horizontal longitudinal direction between a rear side and a front side of said tank body, in a horizontal transverse direction between two mutually-opposite lateral sides and in a vertical direction as defined by gravity, two mutually-opposite directions and heights being defined vertically, said body being connected to said inlet of the settling tank to provide means so that the input fluid remains in the body for a time during which the particles are driven by gravity in sedimentation displacement relative to said base fluid and along said vertical direction, the displacement being driven in a sedimentation direction depending on said sign of said difference in density and corresponding to a reduction in said heights, said particles remaining in the body for a sufficient length of time for the sedimentation displacement to cause a deposit constituted by at least some of said particles to be extracted from said input fluid;
said settling tank outlet is connected to said settling tank body to form means to provide an output fluid derived from said input fluid, the output fluid being constituted by said base fluid, and having an output concentration of said particles which is at least reduced relative to said input concentration, due to said deposit being extracted; and
said collecting volume is connected to said settling tank body to receive said deposit and to allow it to be discharged from said settling tank;

said settling tank body comprising plates in succession from the rear to the front and each plate having a width along said transverse direction between two lateral edges, each plate also having a length extending along a plate direction between a smaller height edge and a greater height edge constituting two extreme edges of said plate, the length of the plate defining two mutually-opposite directions, each said plate being inclined so that said plate length extends obliquely between said longitudinal and vertical directions, all said plates being inclined in a same direction so that, in said longitudinal direction, their greater height edges are all on the same side of their respective smaller height edges;

each said plate except for the last one, cooperating with a consecutive plate to form a stream in which the base fluid flows along said plate, the two plates forming the stream constituting a collecting plate and a non-collecting plate for the stream such that the point where the collecting plate meets a vertical line is situated at an height that is smaller than that at which the non-collecting plate meets the same vertical line;

said settling tank body having at least one segment which itself comprises three plates arranged consecutively and constituting a rear plate, an intermediate plate and a front plate of the segment;

said rear plate and said intermediate plate forming between them a primary stream of said segment along which said base fluid passes in a primary flow direction along said plate from an inlet of said segment, connected to the inlet of the settling tank, to an intermediate passage of said segment, so that said sedimentation displacement deposits a primary sediment on said collecting plate of the stream, one of said collecting volumes being arranged to receive the sediment when it escapes from the collecting plate, the sediment thus constituting said deposit in the collecting volume;

said intermediate and front plates forming between them a secondary stream along which said base fluid passes in a secondary flow direction opposite to said primary flow direction, the fluid passing along said stream from said intermediate passage to an outlet of said segment, the outlet being connected to said outlet of the settling tank, said intermediate passage being formed around a flow reversal edge constituted by said extreme edge of said intermediate plate, said collecting plates of said primary and secondary streams constituting the primary and secondary collecting plates, wherein said flow reversal edge is constituted by said greater height edge of said intermediate plate, said inlet and said outlet of said segment being situated adjacent said smaller height edge of the intermediate plate, so that said primary stream is the counterflow stream and said secondary stream is the parallel flow steam, and wherein a secondary sediment is also deposited on said secondary collecting plate, one of said collecting volumes being arranged to receive said secondary sediment when it escapes from the secondary collecting plate, the sediment constituting said deposit in the collecting volume.

3. A settling tank according to claim 2, wherein said inlet and outlet of said segment are lateral and situated respectively on the inlet side and the outlet side of said settling tank body, said sides constituting said two mutually-opposite sides in the transverse direction, the lateral inlet and the lateral outlet being also situated at heights greater than that of the primary and secondary escape edges constituted by said smaller heights edges of said primary and secondary collecting plates respectively, said segment also comprising primary and secondary collecting volumes at heights smaller that those of said primary and secondary escape edges and vertically disposed to receive said primary and secondary sediments.

4. A settling tank according to claim 3, wherein said segment is one of a longitudinal succession of segments, said front plate of each segment, except the last segment, also constituting said rear plate of the segment following each segment except for the last segment, said greater height edges of said front and rear plates being formed at heights greater than those of said flow reversal edges so as to isolate said segments from one another whilst defining said intermediate passages within said segments, said primary or secondary collecting volumes of all said segments being connected together longitudinally along the same side of said body and being constituted by successive longitudinal zones of a primary or a secondary collecting tank, respectively, said primary and secondary collecting tanks being separated from one another by a vertical longitudinal partition and each said segment also comprising primary and secondary closure walls sealing the primary and secondary streams from the secondary and primary collecting tanks respectively, so as to prevent unwanted connection between said primary and secondary streams via said collecting tanks.

5. A settling tank according to claim 4, wherein said primary and secondary collecting tanks are situated on the inlet and outlet sides respectively of said settling tank body.

6. A settling tank according to claim 4, also comprising:
   an inlet manifold and an outlet manifold extending longitudinally and interconnecting said inlets and said outlets of all said segments respectively,
   inlet tanks and outlet tanks connected to said inlet and said outlet of the settling tank and to said inlet and outlet manifolds respectively, and
   deposit discharge means for discharging deposits from said collecting tanks.

7. A settling tank according to claim 4, wherein said base fluid is a base liquid, said particles being more dense than said base liquid so that said sedimentation direction is downwards and said heights increased upwards, said flow reversal edge of each said segment being constituted by an upper edge of said intermediate plate, said inlet and outlet of said segment being situated at the bottom of said primary and secondary streams of said segment, respectively, said collecting tanks being situated beneath said plates and lower than said inlets and outlets of said segments.

8. A settling tank according to claim 2, wherein said plates are inclined in a direction such that their greater height edges are in front of their respective smaller height edges, and wherein said intermediate and front plates constitute said primary and secondary collecting plates respectively.

9. A settling tank according to claim 2, wherein said supplying means supplies a base fluid that is a base liquid.

* * * * *